United States Patent
Lee et al.

(10) Patent No.: US 12,068,465 B2
(45) Date of Patent: Aug. 20, 2024

(54) SECONDARY BATTERY ACTIVATION METHOD WITH ENHANCED ABILITY TO DETECT LOW VOLTAGE

(71) Applicant: LG CHEM, LTD., Seoul (KR)

(72) Inventors: Jung Mi Lee, Daejeon (KR); Joon Sung Bae, Daejeon (KR); Nak Gi Sung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 784 days.

(21) Appl. No.: 17/259,749

(22) PCT Filed: Jan. 3, 2020

(86) PCT No.: PCT/KR2020/000143
§ 371 (c)(1),
(2) Date: Jan. 12, 2021

(87) PCT Pub. No.: WO2020/141947
PCT Pub. Date: Jul. 9, 2020

(65) Prior Publication Data
US 2021/0135304 A1   May 6, 2021

(30) Foreign Application Priority Data
Jan. 3, 2019   (KR) .................. 10-2019-0000507

(51) Int. Cl.
*H01M 10/615* (2014.01)
*H01M 4/02* (2006.01)
(Continued)

(52) U.S. Cl.
CPC ......... *H01M 10/615* (2015.04); *H01M 4/364* (2013.01); *H01M 10/0525* (2013.01); *H01M 2004/027* (2013.01); *H01M 2004/028* (2013.01)

(58) Field of Classification Search
CPC ............... H01M 10/615; H01M 4/364; H01M 10/0525; H01M 2004/027;
(Continued)

(56) References Cited

U.S. PATENT DOCUMENTS

| 2016/0252586 A1 | 9/2016 | Shimura et al. | |
| 2016/0261006 A1* | 9/2016 | Ueno | H01M 10/0569 |
| 2020/0194835 A1* | 6/2020 | Asano | H01M 10/0525 |

FOREIGN PATENT DOCUMENTS

| CN | 101154747 A | 4/2008 |
| CN | 105706288 A | 6/2016 |

(Continued)

OTHER PUBLICATIONS

International Search Report (PCT/ISA/210) issued in PCT/KR2020/000143, dated Apr. 16, 2020.
(Continued)

*Primary Examiner* — Matthew T Martin
*Assistant Examiner* — Bartholomew A Hornsby
(74) *Attorney, Agent, or Firm* — Birch, Stewart, Kolasch & Birch, LLP

(57) ABSTRACT

A secondary battery activation method includes a pre-aging step for aging, at room temperature, a secondary battery comprising a positive electrode comprising a positive electrode active material, a negative electrode comprising a negative electrode active material, a separator disposed between the positive electrode and the negative electrode, and an electrolyte; a charging step for primarily charging the pre-aged secondary battery to 60% or more of state of charge (SOC) of the secondary battery; a high-temperature aging step for aging the primarily charged secondary battery at a high temperature; and a room-temperature aging step for aging, at room temperature, the secondary battery which has been aged at a high temperature, wherein the high-tempera-
(Continued)

ture aging step is performed at a temperature of 60° C. or higher.

12 Claims, 6 Drawing Sheets

(51) Int. Cl.
  *H01M 4/36* (2006.01)
  *H01M 10/0525* (2010.01)
(58) Field of Classification Search
  CPC ......... H01M 2004/028; H01M 10/446; H01M 10/48; H01M 4/0447; H01M 4/139; Y02P 70/50; G01R 31/3835
  See application file for complete search history.

(56) References Cited

FOREIGN PATENT DOCUMENTS

| | | | |
|---|---|---|---|
| JP | 9-63636 | A | 3/1997 |
| JP | 2000-340262 | A | 12/2000 |
| JP | 2005-327592 | A | 11/2005 |
| JP | 5308806 | B2 | 10/2013 |
| JP | 2014-192015 | A | 10/2014 |
| JP | 2015032517 | A * | 2/2015 |
| JP | 2015-95334 | A | 5/2015 |
| JP | 2016-162559 | A | 9/2016 |
| JP | 2017106867 | A * | 6/2017 |
| JP | 2019160391 | A * | 9/2019 |
| KR | 10-2007-0082379 | A | 8/2007 |
| KR | 10-2014-0139357 | A | 12/2014 |
| KR | 10-2015-0015417 | A | 2/2015 |
| KR | 10-2017-0101582 | A | 9/2017 |
| KR | 10-2018-0071798 | A | 6/2018 |
| KR | 10-2018-0090744 | A | 8/2018 |

OTHER PUBLICATIONS

Extended European Search Report for corresponding European Application No. 20736205.4, dated Jan. 27, 2022.

* cited by examiner

[FIG. 1]
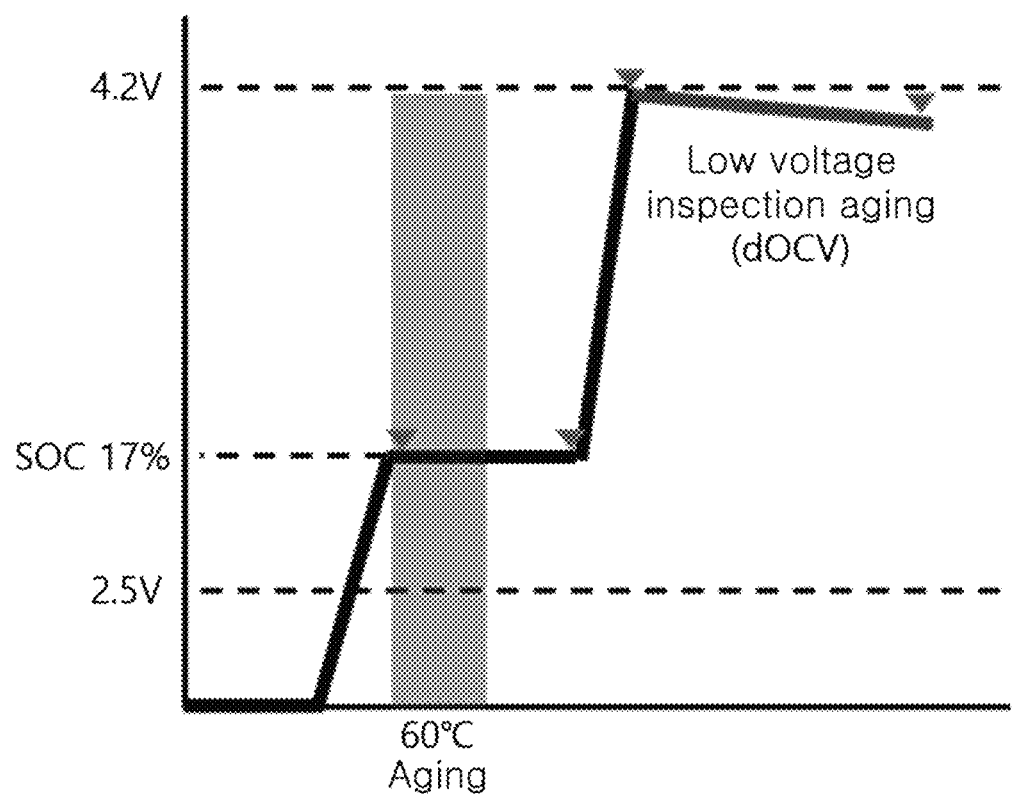

[FIG. 2]
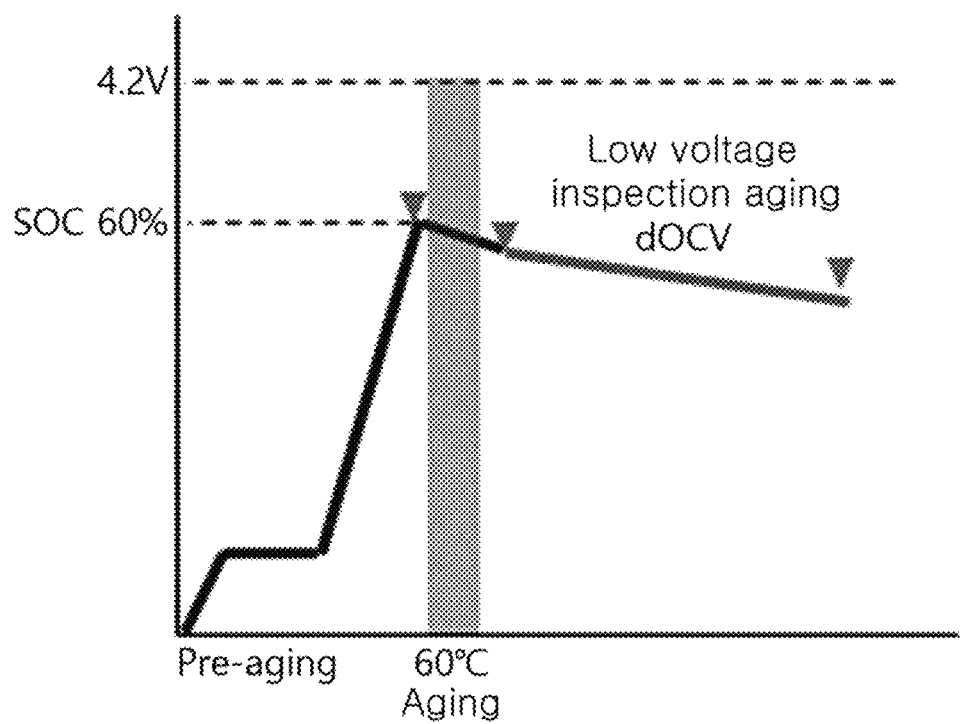

[FIG. 3]
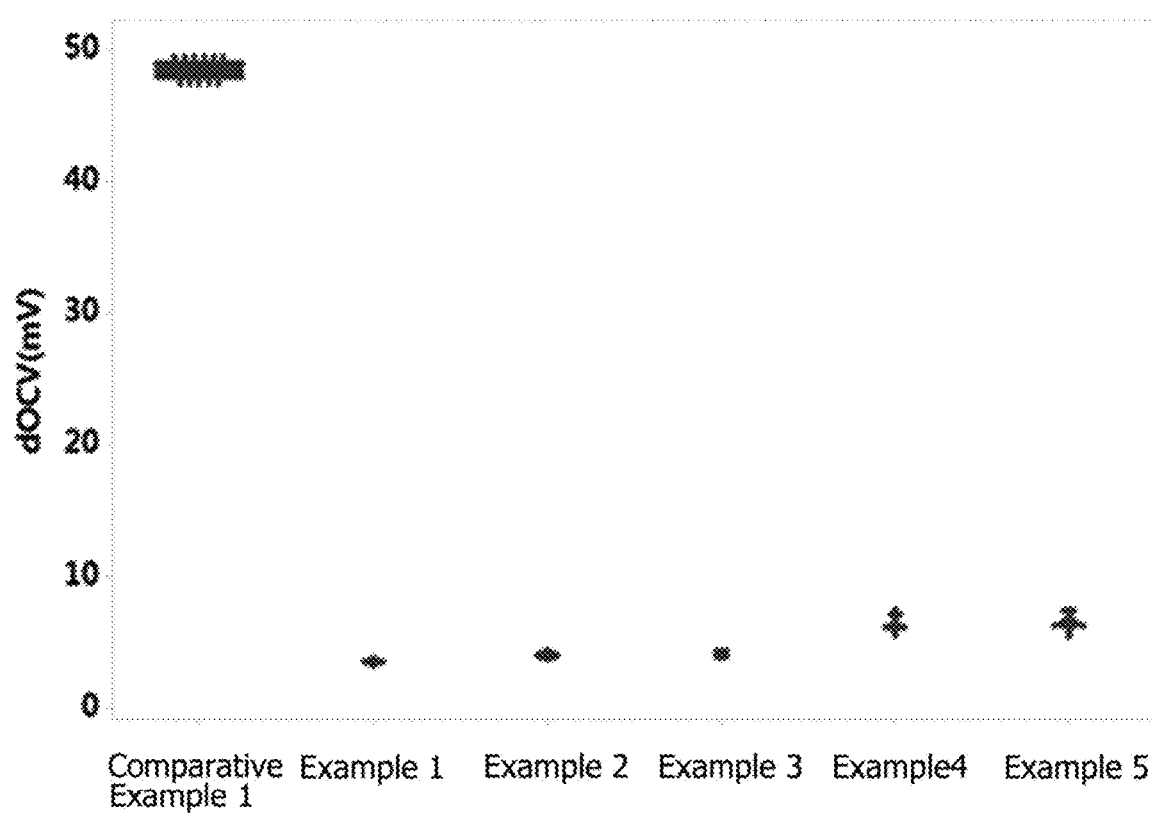

[FIG. 4]
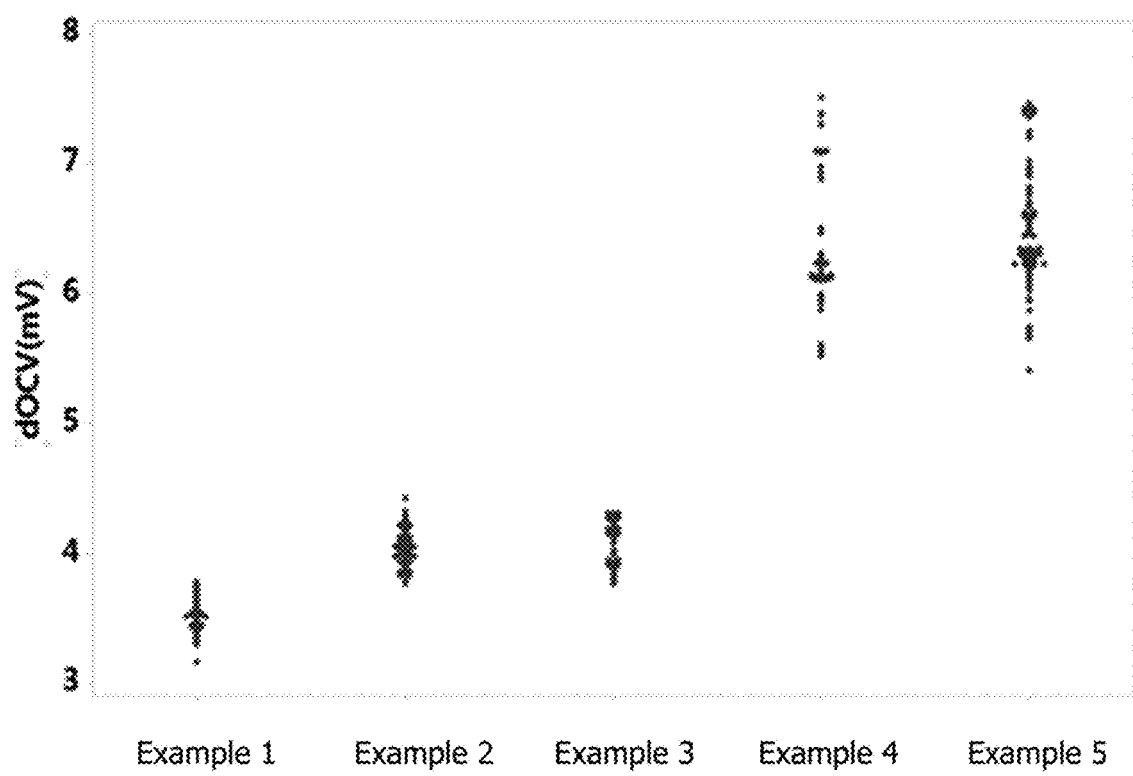

[FIG. 5]
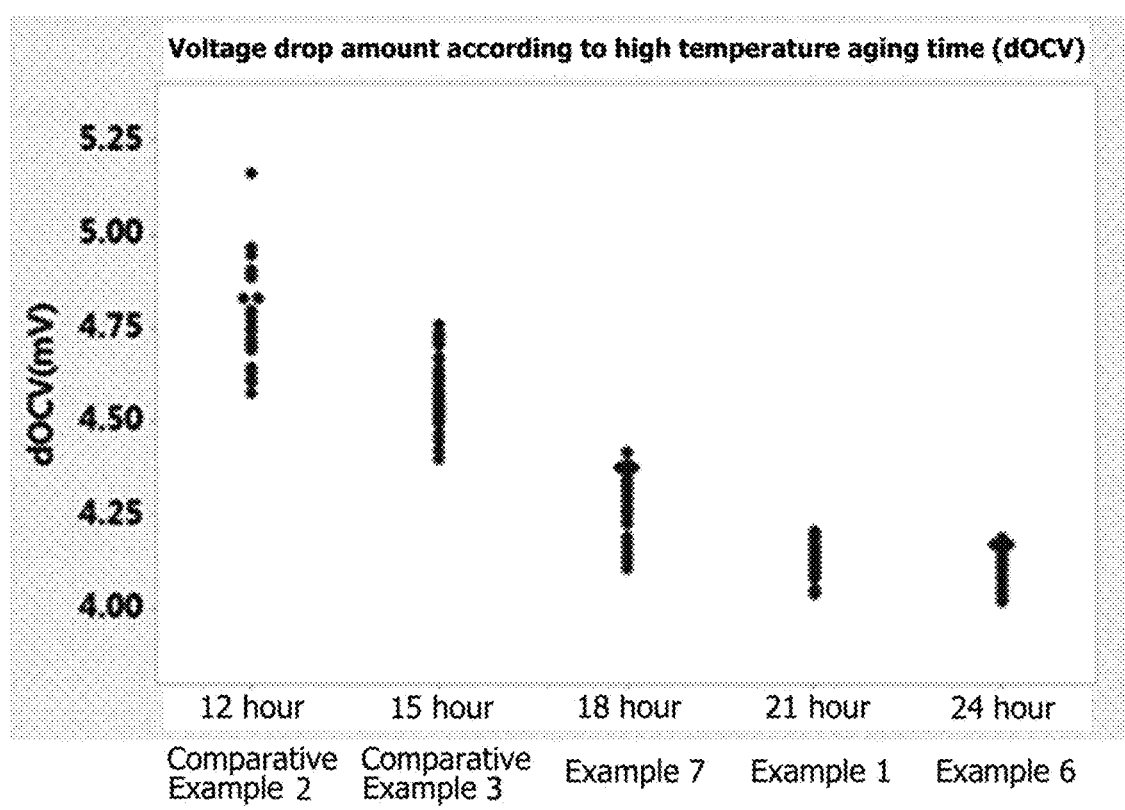

[FIG. 6]
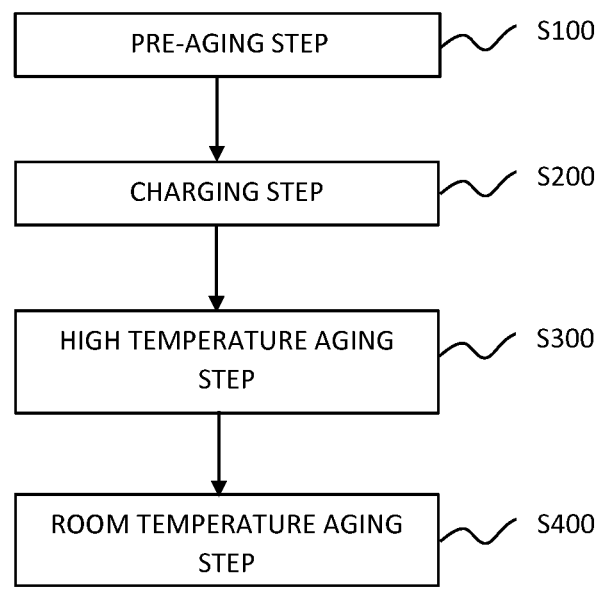

SECONDARY BATTERY ACTIVATION METHOD WITH ENHANCED ABILITY TO DETECT LOW VOLTAGE

TECHNICAL FIELD

This application claims the benefit of priority based on Korean Patent Application No. 10-2019-0000507, filed on Jan. 3, 2019, and the entire contents of the Korean patent application are incorporated herein by reference.

The present invention relates to a method for activating a secondary battery, and more particularly, to a method of activating a secondary battery having improved detection power of a low voltage defect by increasing a voltage drop amount of a defective product while reducing a voltage drop amount of a good product when detecting a low voltage defect.

BACKGROUND ART

In general, a secondary battery, unlike a primary battery that cannot be charged, means a battery that can be charged and discharged, and is widely used in electronic devices such as mobile phones, notebook computers, camcorders, or electric vehicles. In particular, the lithium secondary battery has a larger capacity than a nickel-cadmium battery or a nickel-metal hydride battery, and because the energy density per unit weight is high, the degree of utilization thereof is rapidly increasing.

The lithium secondary battery mainly uses a lithium-based oxide and a carbon material as a positive electrode active material and a negative electrode active material, respectively. The lithium secondary battery includes an electrode assembly, in which a positive electrode plate and a negative electrode plate coated with the positive electrode active material and the negative electrode active material, respectively, are disposed with a separator therebetween, and an exterior material that seals and stores the electrode assembly together with the electrolyte.

Meanwhile, the lithium secondary battery may be classified into a can-type secondary battery in which the electrode assembly is embedded in a metal can and a pouch-type secondary battery in which the electrode assembly is embedded in a pouch of an aluminum laminate sheet, depending on the shape of the battery case.

A secondary battery is generally manufactured through a process in which a liquid electrolyte is injected while the electrode assembly is stored in the battery case, and the battery case is sealed.

In the lithium secondary battery, various types of defects may occur due to various causes during a manufacturing process or use. In particular, some of secondary batteries that have been manufactured have a phenomenon of exhibiting a voltage drop behavior over a self-discharge rate, and this phenomenon is called low voltage.

The low voltage failure phenomenon of the secondary battery is often due to a foreign metal material located therein. In particular, when a metal foreign material such as iron or copper is present in the positive electrode plate of the secondary battery, the metal foreign material may grow as a dendrite at the negative electrode. In addition, such a dendrite causes an internal short circuit of the secondary battery, which may cause failure or damage of the secondary battery or, in severe cases, ignition.

On the other hand, the above-mentioned metal-induced low-voltage defects appear as an increase in the relative voltage drop, and low-voltage defects are detected through the aging process during the activation process of the secondary battery.

FIG. 1 is a schematic view showing process conditions for each step of a conventional activation process. Referring to this, conventionally, an activation process was performed in a manner that a pre-aged battery is primarily charged in the range of 10-40% SOC, the primary charged secondary battery is aged at a high temperature, the secondary battery aged at a high temperature is secondary charged, and then aged at room temperature. Further, the OCV is measured at two selected time points among the room temperature aging process, and the change value (voltage drop) of the OCV is compared with the reference value. Then low voltage defects have been selected in such a way that a battery having the voltage drop amount below the reference value is judged as a good product.

However, the method described above has a region in which the voltage drop amount of a good product and the voltage drop amount of a bad product appear at the same level, so it is difficult to accurately select a low voltage defect. Therefore, in order to improve the low-voltage defect detection power, a technology of reducing the voltage drop amount of a good product and increasing the voltage drop amount of a defective product is required.

DISCLOSURE

Technical Problem

The present invention is proposed to solve the above problems, and an object of the present invention is to provide a method of activating a secondary battery that improves dispersion by reducing a voltage drop amount of a good product and increases a detection voltage of a low voltage defect by increasing a voltage drop amount of a defective product.

Other objects and advantages of the present invention can be understood by the following description, and will be more clearly understood by the embodiments of the present invention. It will also be readily appreciated that the objects and advantages of the invention may be realized by the means and combinations thereof indicated in the claims.

Technical Solution

The activation method of the secondary battery according to the present invention for achieving the above object includes: a pre-aging step of aging a secondary battery including a positive electrode containing a positive electrode active material, a negative electrode containing a negative electrode active material, a separator interposed between the positive electrode and the negative electrode, and an electrolyte, at a room temperature; a charging step of primary charging the pre-aged secondary battery to 60% or more state of charge (SOC) of the secondary battery; a high temperature aging step of aging the primary charged secondary battery at a temperature of 60° C. or higher; and a room temperature aging step of aging the high temperature aging secondary battery at a room temperature.

Herein, the charging step may be performed at a charging voltage of 3.0 to 4.0V and a C-rate of 1.0 C or less.

Further, the charging step may include a first charging section up to 10% SOC of the secondary battery, a second charging section up to 40% SOC of the secondary battery, and a third charging section, which is a subsequent section, and in the second charging section, charging may be performed at a rate of 0.5 C or less.

At this time, the charging rate in the second charging section may be higher than the charging rate in the first charging section and the charging rate in the third charging section, and a ratio of the charging rate in the first charging section and the charging rate in the third charging section may be 2:3 to 3:2.

Further, the high temperature aging step may be performed for 18 to 36 hours, more preferably for 21 to 24 hours.

Further, in the charging step, the charging may be performed up to 65% to 75% SOC of the secondary battery.

Further, the room temperature aging step may include determining whether the secondary battery has a low voltage failure from a voltage drop amount by measuring a change in a voltage value during the room temperature aging step.

At this time, the measuring of the change in the voltage value may include measuring a voltage value V1 at a starting point of the room temperature aging step and measuring a voltage value V2 at an ending point of a the room temperature aging step, and then determining whether a voltage drop (V1-V2), which is a difference between the voltage value at the starting point and the voltage value at the ending point, satisfies a reference value range condition.

The activation method of the present invention may further include a secondary charging step of charging the secondary battery at a rate of 0.1 to 2.0 C after the room temperature aging step.

In the activation method of the present invention, an average value of a voltage drop of a good product may be 10 mV or less.

In the activation method of the present invention, a standard deviation of a voltage drop of a good product may be 0.5 mV or less.

Further, the present invention provides a device for inspecting a low voltage failure of a secondary battery, the device including: an assembly unit configured to assemble the secondary battery by accommodating a positive electrode containing a positive electrode active material, a negative electrode containing a negative electrode active material, a separator interposed between the positive electrode and the negative electrode, and an electrolyte, in a battery case; a pre-aging unit configured to pre-age the secondary battery assembled by the assembly unit; a charging unit configured to primary charge the pre-aged secondary battery to 60% or more SOC of a secondary battery; a high temperature aging unit configured to age the primary charged secondary battery at a temperature of 60° C. or higher; a room temperature aging unit configured to age the high temperature aged secondary battery at a room temperature; and a detection unit configured to detect a low voltage failure of the secondary battery.

The charging unit may charge the secondary battery at three sections including a first charging section up to 10% SOC of the secondary battery, a second charging section up to 40% SOC of the secondary battery, and a third charging section, which is a subsequent section, and in the second charging section, charging may be performed at a rate of 0.5 C or less.

Advantageous Effects

The activation method of the present invention forms a negative electrode SEI film uniformly and stably by primary charging, accelerates SEI film stabilization through high temperature aging, reduces the voltage drop of good products, improves dispersion, and improves the detection power of low voltage defects.

Accordingly, according to these aspects of the present invention, it is possible to prevent a defective secondary battery from being distributed or used by detecting a secondary battery having high possibility of a low voltage defect early, and it is possible to prevent problems such as failure, damage or ignition of the secondary battery during the use of the secondary battery.

BRIEF DESCRIPTION OF THE DRAWINGS

FIG. 1 is a schematic diagram showing step-by-step process conditions of a conventional activation method.

FIG. 2 is a schematic diagram showing step-by-step process conditions of an activation method according to an embodiment of the present invention.

FIG. 3 is a graph showing a voltage drop amount of the secondary battery performing the activation process of Examples and Comparative Examples of the present invention.

FIG. 4 is an enlarged graph of FIG. 3.

FIG. 5 is a graph showing a voltage drop of the secondary battery according to the high temperature aging time of the present invention.

FIG. 6 is flowchart of the activation method according to an embodiment of the present invention.

DETAILED DESCRIPTION OF THE PREFERRED EMBODIMENTS

Hereinafter, preferred embodiments of the present invention will be described in detail with reference to the accompanying drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

FIG. 2 is a schematic diagram showing step-by-step process conditions of an activation method according to an embodiment of the present invention and FIG. 6 is a flow chart of the activation method according to an embodiment of the present invention. Referring to FIGS. 2 and 6, the activation method of a secondary battery of the present invention includes: a pre-aging step of aging a secondary battery including a positive electrode containing a positive electrode active material, a negative electrode containing a negative electrode active material, a separator interposed between the positive electrode and the negative electrode, and an electrolyte, at a room temperature (S100); a charging step of primary charging the pre-aged secondary battery to 60% or more state of charge (SOC) of a secondary battery (S200); a high temperature aging step of aging the primary charged secondary battery at a temperature of 60° ° C. or higher (S300); and a room temperature aging step of aging the high temperature aging secondary battery at a room temperature (S400), in which the high temperature aging step is performed at a temperature of 60° C. or more.

First, in the pre-aging step, an electrode mixture including an electrode active material and a binder is applied to an electrode current collector to prepare a positive electrode and a negative electrode, respectively, and then an electrode assembly is prepared by interposing a separator between the positive electrode and the negative electrode.

After the electrode assembly thus prepared is accommodated in a battery case, an electrolyte is injected, and the battery case is sealed to manufacture a battery.

The step of manufacturing such a battery is not particularly limited and can be performed according to a known method.

In addition, the electrode assembly is not particularly limited as long as it is a structure including a positive electrode, a negative electrode, and a separator interposed between the positive electrode and the negative electrode, and may be, for example, a jelly-roll type, a stack type, or a stack/folding type.

The battery case is not particularly limited as long as it is used as an exterior material for packaging the battery, and a cylindrical, square, or pouch type may be used.

The electrolyte includes an organic solvent and a lithium salt, and may optionally further contain an additive.

The organic solvent is not limited as long as decomposition by an oxidation reaction or the like during charging and discharging of the battery can be minimized, and may be, for example, cyclic carbonate, linear carbonate, ester, ether, or ketone. These may be used alone, or two or more of them may be used in combination.

Among the organic solvents, carbonate-based organic solvents can be preferably used. Examples of cyclic carbonates include ethylene carbonate (EC), propylene carbonate (PC) and butylene carbonate (BC). Linear carbonates include dimethyl carbonate (DMC), diethyl carbonate (DEC), dipropyl carbonate (DPC), ethyl methyl carbonate (EMC), methylpropyl carbonate (MPC), and ethylpropyl carbonate (EPC).

Lithium salts commonly used in electrolytes of lithium secondary batteries such as $LiPF_6$, $LiAsF_6$, $LiCF_3SO_3$, $LiN(CF_3SO_2)_2$, $LiBF_4$, $LiBF_6$, $LiSbF_6$, $LiN(C_2F_5SO_2)_2$, $LiAlO_4$, $LiAlCl_4$, $LiSO_3CF_3$ and $LiClO_4$, etc. can be used for the lithium salt without limitation, and these can be used alone, two or more can be used in combination.

In addition, the electrolyte may optionally further include an additive. Any one or a mixture of two or more selected from a group consisting of vinylene carbonate, vinylethylene carbonate, fluoroethylene carbonate, cyclic sulfite, saturated sultone, unsaturated sultone, acyclic sulfone, lithium oxalyl difluoroborate (LiODFB), and derivatives thereof may be used as the additive in order to stably form an SEI film, but not limited thereto.

The cyclic sulfite may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, etc. Saturated sultone may include 1,3-propane sultone and 1,4-butane sultone, etc. Unsaturated sultone may include ethene sultone, 1,3-propene sultone, 1,4-butene sultone, and 1-methyl-1,3-propene sultone. The acyclic sulfone may include divinyl sulfone, dimethyl sulfone, diethyl sulfone, methylethyl sulfone, and methylvinyl sulfone.

These additives are added to the electrolyte to improve low temperature output characteristics by forming a solid SEI film on the negative electrode, as well as to suppress decomposition of the positive electrode surface and prevent oxidation reaction of the electrolyte during high temperature cycle operation.

When the battery case is of a pouch type, an aluminum laminated pouch including an aluminum layer may be used. After the electrolyte is injected, the opened portion of the aluminum laminated pouch can be sealed by heat welding.

In the pre-aging step (S100), wetting of the battery by the electrolyte injected is performed.

More specifically, when the secondary battery is charged, if the electrons move to the negative electrode and charged, lithium ions are intercalated to the negative electrode to achieve charge neutrality. At this time, lithium ions can be occluded at the site where the electrolyte is impregnated, that is, where the ion migration path is maintained (wetting area), but occlusion is relatively difficult at the electrolyte non-wetting area.

Therefore, through the pre-aging step, the battery can be aged for 0.5 to 72 hours at room temperature and atmospheric pressure so that the electrolyte can be permeated into the positive and negative electrodes. For example, the pre-aging step may be performed at 20° C. to 30° C., specifically 22° C. to 28° C., more specifically 23° C. to 27° C., and even more specifically 25° C. to 27° C.

Next, a charging step (S200) of primary charging the pre-aged secondary battery to 60% or more state of charge (SOC) of the secondary battery is performed.

The charging step S200 is a step of forming a solid electrolyte interface (hereinafter referred to as "SEI") film layer, and in the present invention, the primary charge is characterized by charging the battery to 60% or more state of charge (SOC).

In order to improve the dispersion by reducing the voltage drop of a good quality secondary battery, the SEI film of the negative electrode should be formed uniformly and stably, which can be achieved only when the volume of the negative electrode is expanded to the maximum. The inventors of the present invention found that the SEI film is formed as uniformly as possible when the charge is performed at 60% or higher state of charge (SOC) during the primary charging, and the voltage drop amount of the good product is reduced, which has led the inventors to the present invention.

Therefore, during the primary charging, if the charging is performed at less than 60% of SOC, it may be difficult to achieve the object of the present invention, which is not preferable.

In one embodiment of the present invention, the charging amount of the charging step is preferably charged to 65% to 75% SOC of the secondary battery.

Charging in the charging step (S200) may be performed according to the conditions known in the art.

In one embodiment of the present invention, the charging step (S200) may be performed at a charging voltage of 3.0 to 4.0V and a C-rate of 1.0 C or less. However, in the case of such a charging voltage, it may vary depending on the type or characteristics of the secondary battery.

In another embodiment of the present invention, the charging step (S200) may have a three-step process rather than a one-step process. Namely, the charging step may include a first charging section up to 10% SOC of the secondary battery, a second charging section up to 40% SOC of the secondary battery, and a third charging section of the subsequent section, and charging may be performed by setting different charging conditions for each of the three sections. At this time, the charging rate in the second charging section is preferably 0.5 C or less.

In a preferred embodiment of the present invention, the charging rate in the second charging section is preferably higher than the charging rate in the first charging section and the charging rate in the third charging section. At this time, the ratio of the charging rate in the first charging section and the charging rate in the third charging section is more preferably 2:3 to 3:2.

For example, the charging step S200 may be perform at a rate of 0.2 C up to 10% SOC of the secondary battery, at a rate of 0.25 C up to 40% SOC of the secondary battery, and at a rate of 0.2 C up to 65% SOC of the secondary battery.

Further, the charging step (S200) may be performed at 20° C. to 30° C., specifically 22° C. to 28° C., more specifically 23° C. to 27° C., and even more specifically 25° C. to 27° C.

Thereafter, a high temperature aging step (S300) of aging the charged battery in a high temperature environment of 60° C. or higher is performed.

The high temperature aging step (S300) is a step of stabilizing the SEI film formed in the charging step earlier, and the stabilization of the SEI film is further accelerated through high temperature aging to reduce the amount of voltage drop of good products in the defective inspection aging section described later.

Particularly, in the present invention, the high-temperature aging step is performed at a high temperature of 60° C. or higher, preferably 65° C. to 75° C., thereby accelerating stabilization of the SEI film of good products and reducing the amount of self-discharge of good products to improve low voltage detection. When the high temperature aging is performed at a temperature of less than 60° C., it is difficult to achieve the object of the present invention, and when the temperature is too high, there is a problem that battery performance, such as capacity and life, is deteriorated.

In one embodiment of the present invention, the high-temperature aging step may be performed for 18 hours to 36 hours, more preferably 21 hours to 24 hours. If the high temperature aging time is less than 18 hours, the stabilization of the SEI film may not be sufficient to achieve the object of the present invention, and when the high temperature aging time exceeds 36 hours, the aging time is prolonged, which is undesirable in terms of productivity.

In addition, the method for activating a secondary battery according to an embodiment of the present invention may further include a pressing step of pressing the secondary battery after the high temperature aging step (S300). The pressing step is a step of improving the thickness expansion of the secondary battery because the thickness of the secondary battery is expanded by a side reaction gas or the like. The pressing step may be performed for 4 to 6 seconds at 650 to 850 kgf, but is not limited thereto, and the pressing step may be omitted in some cases.

Thereafter, a room temperature aging step (S400) of aging the high temperature aged secondary battery at room temperature is performed. The room temperature aging step may be performed at 20° C. to 30° C., specifically 22° C. to 28° C., more specifically 23° C. to 27° C., and even more specifically 25° C. to 27° C.

The room temperature aging step (S400) may include measuring a change in voltage value while aging the secondary battery. This may be configured to determine whether the secondary battery has a low voltage defect by using the open circuit voltage (OCV) measured at different time points. For example, a high temperature aged secondary battery is stored at room temperature, but OCV is measured at least at two time points. And by comparing the difference value between respective OCVs with a reference value stored in advance in the memory unit or the like, it is possible to select whether the secondary battery has a low voltage defect.

In one embodiment of the present invention, the selection of whether the secondary battery has a low voltage defect is performed by measuring the voltage value V1 at the starting point of aging at room temperature and measuring the voltage value V2 at the ending point of aging at room temperature, and then determining whether the voltage drop (V1-V2), which is the difference between the start and end voltage values, satisfies the reference value range condition.

More specifically, when the voltage drop amount measurement value of the secondary battery to be inspected is 20 mV, and the reference value of the voltage drop amount of the good product is 10 mV, the measured voltage drop amount is greater than the reference value, so such a secondary battery can be judged as having a low voltage defect.

The activation method of the present invention may further include a secondary charging step of charging the secondary battery at a rate of 0.1 to 2.0 C after the room temperature aging step (S400).

In addition, since the side reaction gas generated inside the secondary battery by the charging step and the high temperature aging step may cause a swelling phenomenon of the battery, the activation method of the present invention may further include a degassing process of removing such side reaction gases.

In the degassing process, various degassing techniques known at the time of filing the present invention can be employed. For example, the degassing process may be performed by cutting an extended portion and sealing the cut portion in a pouch-type secondary battery having one side extended. However, since such a degassing technique is widely known to those skilled in the art, a more detailed description is omitted here.

In the activation method of the present invention as described above, the average value of the voltage drop amount of the good product is 10 mV or less, and the deviation of the voltage drop amount of the good product is 0.5 mV or less. As such, the average value and the deviation of the voltage drop amount of a good product are small, thereby improving the low voltage detection power.

Further, the present invention provides a device for inspecting a low voltage failure of a secondary battery, the device including: an assembly unit configured to assemble the secondary battery by accommodating a positive electrode containing a positive electrode active material, a negative electrode containing a negative electrode active material, a separator interposed between the positive electrode and the negative electrode, and an electrolyte, in a battery case; a pre-aging unit configured to pre-age the secondary battery assembled by the assembly unit; a charging unit configured to primary charge the pre-aged secondary battery to 60% or more state of charge (SOC) of a secondary battery; a high temperature aging unit configured to age the primary charged secondary battery at a temperature of 60° C. or higher; a room temperature aging unit configured to age the high temperature aged secondary battery at a room temperature; and a detection unit configured to detect a low voltage failure of the secondary battery. The low voltage failure inspection device of the secondary battery may perform an activation process of the secondary battery described above.

The assembly unit can assemble a secondary battery. Here, the secondary battery may include an electrode assembly and an electrolyte. In addition, the electrode assembly may be stored in the battery case together with the electrolyte. In addition, the battery case may be sealed in a form in which the electrode assembly and the electrolyte are stored.

The assembly unit may be configured to include an electrode assembly stacking unit in which a positive electrode plate, a negative electrode plate and a separator are stacked, an electrolyte injection unit that injects electrolyte into a battery case, and a heat-sealing unit that heat-seals the battery case. In the configuration of assembling the secondary battery, various battery assembling techniques known at the time of filing the present application may be employed, and detailed descriptions thereof will be omitted.

The pre-aging unit may age the secondary battery assembled by the assembly unit. In particular, the pre-aging unit may be configured to perform a pre-aging step (S100). Specifically, the battery can be aged for 0.5 to 72 hours at room temperature and atmospheric pressure so that the electrolyte can be permeated into the positive and negative electrodes. For example, the pre-aging step may be configured to store the secondary battery at 20° C. to 30° C., specifically 22° C. to 28° C., more specifically 23° C. to 27° C., and even more specifically 25° C. to 27° C. For such a configuration, the pre-aging unit may include a chamber having an empty space therein and maintaining the internal temperature within a predetermined range.

The charging unit may charge a secondary battery pre-aged by the pre-aging unit. In particular, the charging unit may be configured to perform the charging step (S200). For example, the charging unit may be configured to charge the secondary battery at a charge amount of 60% or more state of charge (SOC) of the secondary battery. In addition, the charging unit may be configured to charge the secondary battery at a rate of 1.0 C or less.

For this configuration, the charging unit may include a power generation unit that generates power to be supplied to the secondary battery and a connection terminal that contacts the electrode lead of the secondary battery and transfers power supplied from the power generation unit to the secondary battery.

In particular, in the charging step (S200), the charging unit may perform the charging process of the secondary battery at three divided sections which are a first charging section up to 10% SOC of the secondary battery, a second charging section up to 40% SOC of the secondary battery, and a third charging section up to 65% SOC of the secondary battery, in which the charging unit may be configured to charge at a rate of 0.5 C or less in the second charging section.

The high temperature aging unit may age the secondary battery that is primarily charged by the charging unit to a temperature of 60° C. or higher. In particular, the high temperature aging unit may be configured to perform the high temperature aging step (S300), which accelerates stabilization of the SEI film formed by primary charging. For such a configuration, the high-temperature aging unit includes a chamber having an empty space therein and capable of maintaining an internal temperature within a predetermined range, a temperature sensor unit sensing the temperature inside the chamber, a temperature control unit for controlling the temperature inside the chamber, a heating unit for increasing the temperature inside the chamber, and a cooling unit for lowering the temperature inside the chamber.

The room temperature aging unit may age the secondary battery aged by the high temperature aging unit at room temperature. In particular, the room temperature aging unit may be configured to perform the room temperature aging step (S400). Specifically, the battery can be aged for 0.5 to 72 hours at room temperature and pressure. For example, the pre-aging step may be configured to store the secondary battery at 20° C. to 30° C., specifically 22° C. to 28° C., more specifically 23° C. to 27° C., and even more specifically 25° C. to 27° C. For such a configuration, the pre-aging unit may include a chamber having an empty space therein and maintaining the internal temperature within a predetermined range.

The detection unit can detect a defect in a secondary battery that has completed primary charging and high temperature aging. In particular, the detection unit may be configured to perform low voltage defect detection performed in the room temperature aging step (S400).

In particular, the detection unit may determine whether the secondary battery is defective by comparing the difference (voltage drop amount) of two or more OCV values measured at different time points with respect to the secondary battery with a reference value.

In addition, the low voltage failure inspection device of the secondary battery according to the present invention may further include a secondary charging unit.

Meanwhile, at least some of the components of the low voltage failure inspection device of the secondary battery according to the present invention may be one common component. For example, the pre-aging unit and the room temperature aging unit may be implemented as one common component. That is, one aging unit may be configured to function as a pre-aging unit and a room temperature aging unit.

According to this configuration of the present invention, the voltage drop amount and the standard deviation of a good product are reduced, so that the low voltage defect detection power of the secondary battery can be improved.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Preparation Example 1—Preparation of Secondary Battery (Normal Secondary Battery) Without Foreign Matter A positive electrode mixture was prepared by mixing 96.7 parts by weight of $Li[Ni_{0.6}Mn_{0.2}Co_{0.2}]O_2$ serving as a positive electrode active material, 1.3 parts by weight of graphite serving as a conductive material, and 2.0 parts by weight of polyvinylidene fluoride (PVdF) serving as a binder. The positive electrode mixture slurry was prepared by dispersing the obtained positive electrode mixture in 1-methyl-2-pyrrolidone functioning as a solvent. A positive electrode was prepared by coating, drying, and pressing the slurry on both sides of an aluminum foil having a thickness of 20 μm, respectively.

A negative electrode mixture was prepared by mixing 97.6 parts by weight of artificial graphite and natural graphite that function as negative electrode active materials (weight ratio: 90:10), 1.2 parts by weight of styrene-butadiene rubber (SBR) that functions as a binder, and 1.2 parts by weight of carboxymethyl cellulose (CMC). The negative electrode mixture slurry was prepared by dispersing the negative electrode mixture in ion-exchanged water functioning as a solvent. A negative electrode was prepared by coating, drying, and pressing the slurry on both sides of an copper foil having a thickness of 20 μm.

A non-aqueous electrolyte solution was prepared by dissolving $LiPF_6$ in an organic solvent, in which ethylene carbonate (EC), propylene carbonate (PC), and diethyl carbonate (DEC) were mixed in a composition of 3:3:4 (volume ratio). Herein, $LiPF_6$ was dissolved in the organic solvent to be a concentration of 1.0M.

A lithium secondary battery was prepared by laminating a porous polyethylene separator between the positive electrode and the negative electrode prepared above and storing them in a pouch, and then injecting the electrolyte.

Example 1

20 secondary batteries of Preparation Example 1 were prepared, aged at room temperature of 25° C. for 24 hours, and pre-aged. The pre-aged secondary batteries were charged at a rate of 0.2 C to a 65% SOC, completing the primary charging (single charging method). Then, high temperature aging was performed at a temperature of 65° C. for 21 hours, and room temperature aging was performed at a room temperature of 25° C.

Example 2

The activation process was performed in the same way except that when the primary charge in Example 1 above was performed, the charging was performed at C-rate of 0.2 C in the first charging section up to 10% SOC, at C-rate of 0.25 C in the second charging section up to 40% SOC, and at C-rate of 0.2 C in the third charging section up to 65% SOC (three step charge).

Example 3

In the first charging in Example 2, the activation process was performed in the same manner as in Example 2, except that the charging rate of the second charging section was changed to 0.5 C.

Example 4

In the first charging in Example 2, the activation process was performed in the same manner as in Example 2, except that the charging rate of the second charging section was changed to 0.75 C.

Example 5

In the first charging in Example 2, the activation process was performed in the same manner as in Example 2, except that the charging rate of the second charging section was changed to 1.0 C.

Example 6

In Example 1, the activation process was performed in the same manner as in Example 1, except that the aging time was changed to 24 hours during high temperature aging.

Example 7

In Example 1, the activation process was performed in the same manner as in Example 1, except that the aging time was changed to 18 hours during high temperature aging.

Comparative Example 1

20 secondary batteries of Preparation Example 1 were prepared, aged at room temperature of 25° C. for 48 hours, and pre-aged. The pre-aged secondary batteries were charged at a rate of 0.2 C to a 17% SOC, completing the primary charging. Thereafter, high temperature aging was performed at a temperature of 65° C. for 21 hours, secondary charging was performed at a rate of 0.2 C up to 90% SOC, and then room temperature aging was performed at room temperature of 25° C.

Comparative Example 2

In Example 1, the activation process was performed in the same manner as in Example 1, except that the aging time was changed to 12 hours during high temperature aging.

Comparative Example 3

In Example 1, the activation process was performed in the same manner as in Example 1, except that the aging time was changed to 15 hours during high temperature aging.

EXPERIMENTAL EXAMPLE

Measurement of Voltage Drop

In the activation process of Examples 1 to 7 and Comparative Examples 1 to 3, the OCV of secondary battery at the beginning of room temperature aging and the OCV of the secondary battery when 0.5 days elapse after the start of aging at room temperature were respectively measured, and the result of the measured ΔOCV (voltage drop) are shown in FIGS. 3 to 5. Further, the average value and the deviation of each ΔOCV (voltage drop amount) of Examples 1 to 5 and Comparative Example 1 were calculated, and the results are shown in Table 1.

TABLE 1

| | Primary charging condition | High temperature aging time (Hour) | Average value of voltage drop | Deviation of voltage drop |
|---|---|---|---|---|
| Example 1 | 0.2 C. 65% SOC | 21 | 3.54 | 0.12 |
| Example 2 | 0.2 C. 10% SOC → 0.25 C. 40% SOC → 0.2 C. 65% SOC | 21 | 4.05 | 0.13 |
| Example 3 | 0.2 C. 10% SOC → 0.5 C. 40% SOC → 0.2 C. 65% SOC | 21 | 4.00 | 0.19 |
| Example 4 | 0.2 C. 10% SOC → 0.75 C. 40% SOC → 0.2 C. 65% SOC | 21 | 6.16 | 0.44 |
| Example 5 | 0.2 C. 10% SOC → 1.0 C. 40% SOC → 0.2 C. 65% SOC | 21 | 6.31 | 0.43 |
| Comparative Example 1 | 0.2 C. 17% SOC | 21 | 48.5 | 0.51 |

FIG. 3 shows ΔOCV distributions for Examples 1 to 5 and Comparative Example 1, and FIG. 4 is an enlarged graph of FIG. 3. Referring to FIGS. 3 and 4 and Table 1, it was found that the average value of the voltage drop amount and the deviation of the voltage drop amount were remarkably larger in Comparative example 1 in which the charging amount was set to 17% SOC and charged during the primary charging, and then the secondary charging was performed, than in the Examples 1 to 5 in which charging amount was set to 65% SOC during the primary charge. Therefore, in the activation method of Comparative Example 1, the voltage drop amount of a good product may be similar to the voltage drop amount level of a defective product, and thus, the low voltage detection force will inevitably drop.

In addition, the voltage drop amount and deviation of each of Examples 4 to 5, which were charged at a rate exceeding 0.5 C in the second charging section, were found to be significantly smaller than those of Comparative Example 1 and found to be larger than those of Examples 2 to 3. Hence, in the present invention, it is understood that the charging C-rate of the second charging section is preferably 0.5 C or less.

Meanwhile, FIG. 5 shows the amount of each voltage drop according to the high temperature aging time. Referring to this, the voltage drop amounts of Examples 1 and 6 to 7, in which the high temperature aging time was 18 to 24 hours, show a numerical range smaller than the voltage drop amount of Comparative Examples 2 and 3 in which the high temperature aging time was less than 18 hour, and the deviation is also small. Particularly, Example 1 and Example 6 in which the high temperature aging time was 21 to 24 hours showed excellent voltage drop amount and dispersion, and it appears that the activation method of the present invention uses most preferably a high temperature aging time of 21 to 24 hours.

The activation method according to the embodiment of the present invention as described above has an effect of improving the detection power of a low voltage defect as a result of a small amount of voltage drop of a good product and improved dispersion compared to a conventional activation method.

As described above, in the present specification and drawings, preferred embodiments of the present invention have been disclosed. Further, although specific terms are used, they are merely used in a general sense to easily describe the technical content of the present invention and to help understand the present invention, and are not intended to limit the scope of the present invention. It is apparent to those skilled in the art to which the present invention pertains that other modified examples based on the technical spirit of the present invention can be implemented in addition to the embodiments disclosed herein.

The invention claimed is:

1. A method for activating a secondary battery, the method comprising:
   a pre-aging step of aging a secondary battery including a positive electrode containing a positive electrode active material, a negative electrode containing a negative electrode active material, a separator interposed between the positive electrode and the negative electrode, and an electrolyte, at a room temperature;
   a charging step of primary charging the pre-aged secondary battery to 60% or more state of charge (SOC) of the secondary battery;
   a high temperature aging step of aging the primary charged secondary battery at a temperature of 60° C. or higher; and
   a room temperature aging step of aging the high temperature aging secondary battery at a room temperature,
   wherein the charging step includes a first charging section up to 10% SOC of the secondary battery, a second charging section up to 40% SOC of the secondary battery, and a third charging section, which is a subsequent section, wherein, in the second charging section, charging is performed at a rate of 0.5 C or less,
   wherein the charging rate in the second charging section is higher than the charging rate in the first charging section and the charging rate in the third charging section, and
   wherein, in each charging section, the charging rate is constant.

2. The method of claim 1, wherein the charging step includes charging at a C-rate of 1.0 C or less.

3. The method of claim 1, wherein a ratio of the charging rate in the first charging section and the charging rate in the third charging section is 2:3 to 3:2.

4. The method of claim 1, wherein the high temperature aging step is performed for 18 to 36 hours.

5. The method of claim 4, wherein the high temperature aging step is performed for 21 to 24 hours.

6. The method of claim 1, wherein, in the charging step, the charging is performed up to 65% to 75% SOC of the secondary battery.

7. The method of claim 1, wherein the room temperature aging step includes determining whether the secondary battery has a low voltage failure from a voltage drop amount by measuring a change in a voltage value during the room temperature aging step.

8. The method of claim 7, wherein the measuring of the change in the voltage value includes measuring a voltage value V1 at a starting point of the room temperature aging step and measuring a voltage value V2 at an ending point of the room temperature aging step, and then determining whether a voltage drop (V1-V2), which is a difference between the voltage value at the starting point and the voltage value at the ending point, satisfies a reference value range condition.

9. The method of claim 7, wherein an average value of a voltage drop of a good product is 10 mV or less.

10. The method of claim 7, wherein a deviation of a voltage drop of a good product is 0.5 mV or less.

11. The method of claim 1, further comprising a secondary charging step of charging the secondary battery at a rate of 0.1 to 2.0 C after the room temperature aging step.

12. A device for inspecting a low voltage failure of a secondary battery, the device comprising:
   an assembly unit configured to assemble the secondary battery by accommodating a positive electrode containing a positive electrode active material, a negative electrode containing a negative electrode active material, a separator interposed between the positive electrode and the negative electrode, and an electrolyte, in a battery case;
   a pre-aging unit configured to pre-age the secondary battery assembled by the assembly unit;
   a charging unit configured to primary charge the pre-aged secondary battery to 60% or more state of charge (SOC) of the secondary battery;
   a high temperature aging unit configured to age the primary charged secondary battery at a temperature of 60° C. or higher;
   a room temperature aging unit configured to age the high temperature aged secondary battery at a room temperature; and
   a detection unit configured to detect a low voltage failure of the secondary battery,
   wherein the charging unit charges the secondary battery at three sections including a first charging section up to 10% SOC of the secondary battery, a second charging section up to 40% SOC of the secondary battery, and a third charging section, which is a subsequent section, wherein, in the second charging section, charging is performed at a rate of 0.5 C or less,
wherein the charging rate in the second charging section is higher than the charging rate in the first charging section and the charging rate in the third charging section, and
wherein, in each charging section, the charging rate is constant.

* * * * *